United States Patent [19]

Nedza

[11] 4,104,170

[45] Aug. 1, 1978

[54] LIQUID FILTER HAVING IMPROVED EXTENDED POLYPROPYLENE ELEMENT

[75] Inventor: Donald A. Nedza, Furlong, Pa.

[73] Assignee: Met-Pro Corporation, Hatfield, Pa.

[21] Appl. No.: 757,599

[22] Filed: Jan. 7, 1977

Related U.S. Application Data

[63] Continuation-in-part of Ser. No. 608,501, Aug. 28, 1975, abandoned.

[51] Int. Cl.² ............................................. B01D 39/16
[52] U.S. Cl. ..................................... 210/487; 55/498; 55/514; 55/521; 55/528; 210/490; 210/491; 210/492; 210/493 B; 210/502; 210/505; 210/508; 428/181; 428/286; 428/296
[58] Field of Search .............. 210/483, 484, 485, 486, 210/487, 488, 491, 496, 499, 494, 497, 503, 504, 505, 508, 510, 493 R, 435, 493 B, 492, 315, 317, 318, 335, 337, 342, 437, 441, 442, 454, 455, 457, 458, 459–462; 55/DIG. 16, 512, 521, 514, 527, 498, 528

[56] References Cited

U.S. PATENT DOCUMENTS

| | | | |
|---|---|---|---|
| 3,170,826 | 2/1965 | Norton et al. | 210/493 |
| 3,252,270 | 5/1966 | Pall et al. | 55/74 |
| 3,327,859 | 6/1967 | Pall | 210/266 |
| 3,528,546 | 9/1970 | McPherson | 210/96 R |
| 3,867,294 | 2/1975 | Pall et al. | 210/493 |

*Primary Examiner*—Frank Sever
*Attorney, Agent, or Firm*—Woodcock, Washburn, Kurtz & Mackiewicz

[57] ABSTRACT

An improved filter of the cartridge type having concentric inner and outer filter elements is disclosed. The elements are formed of non-woven polypropylene fibers. In a preferred embodiment the outer element is formed of a laminate including a supporting layer of a continuous filament and a filtering layer of randomly oriented polypropylene fibers. The outer element is pleated and the space between the elements is filled with particulate, activated charcoal. The axial ends of the filter components are encapsulated in plastisol end caps to secure them together, and to form a sealable working surface to be engaged by the filter housing.

7 Claims, 3 Drawing Figures

LIQUID FILTER HAVING IMPROVED EXTENDED POLYPROPYLENE ELEMENT

BACKGROUND OF THE INVENTION

This is a continuation in part of application Ser. No. 608,501 filed Aug. 28, 1975 now abandoned.

The present invention relates to improved filtering means, and more particularly to a liquid filter including an extended element composed of a non-woven polypropylene material.

While the general concept of filtering a liquid through a porous substance dates back to ancient times, efforts to provide improved filtering means have continued and indeed have been greatly increased, in recent years. With increased consumer education and public consciousness of the need for pure water has come an impetus for advances in liquid filter technology. An increasing need is felt for highly effective, yet inexpensive filters for filtering water for human consumption. In addition, the need for purifying industrial effluent before returning it to the environment has given rise to a need for efficient, economical filtering means for treating a wide variety of materials.

In theory, highly effective filters can be constructed for removing selected contaminants, and for achieving practically any desired level of purity in a flowing liquid. However, as a matter of practicality both the availability and the cost of suitable filter materials places severe limitations upon the types of filtering means which can be produced. While polypropylene webs of randomly-laid fibers have been adapted for use in such filters, the present inventor has found that when pleated such randomly-laid filter papers are prone to breakage along the folding line. Unfortunately, proneness to breakage is not immediately apparent upon folding of the filter; the breakage encountered seems to arise from use in an environment of relatively high ambient temperatures, and also attributed to aging inasmuch as breakage does not result immediately upon commencement of usage of the filter.

One popular type of filter which is adaptable to both industrial and non-industrial usage is the so-called "cartridge" filter. Such filters are found, for instance, in recirculation systems for industrial plating baths and swimming pools. The cartridges are easily installed and replaced; and, if additional filtering capacity is required it is a simple matter to construct a filter casing which receives a number of cartridges in serial fashion. However, although some types of cartridge elements may be cleaned and re-used filters of this type are intended to be disposed of after their useful life has expired, and replaced with new elements. Accordingly, it will be understood that it would be highly desirable to provide an improved filtering element which is economically constructed and provides a high degree of filtration, but is not susceptible of breakage at pleated folds.

It is therefore an object of the present invention to provide a liquid filter having a filtration element exhibiting superior characteristics.

It is another object of the invention to provide an improved liquid filter having an extended filtration element.

It is another object of the invention to provide an improved liquid filter medium which is not prone to failure at its pleating folds.

Still another object is to provide an improved liquid filter of the charcoal-retaining cartridge type using a polypropylene element.

SUMMARY OF THE INVENTION

Briefly stated, in accordance with one aspect of the invention the foregoing objects are achieved by providing a filter with an extended element composed of non-woven polypropylene material. The material comprises a laminate including a support layer formed of a randomly oriented continuous filament, and an overlayer of randomly-arranged individual fibers.

In one preferred embodiment a cylindrical, extended filter element surrounds a concentric inner element of a similar material, and particulate activated charcoal is disposed in the space between the filter elements. The axial ends of the cylindrical filter are encapsulated with a resilient material which has been modified to lower its curing point below the melting point of the polypropylene filter element.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawings in which:

DESCRIPTION OF A PREFERRED EMBODIMENT

Figure 1:
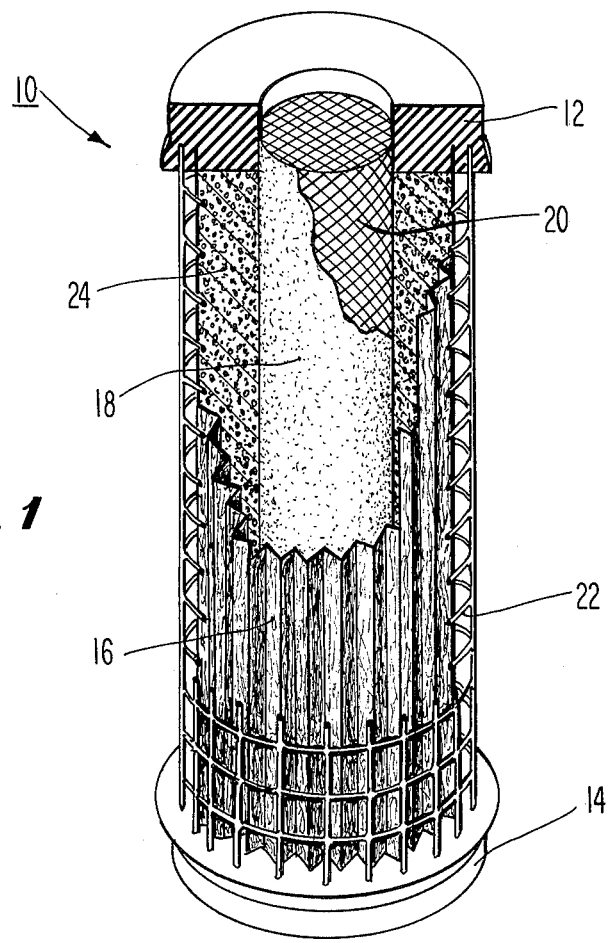
FIG. 1 is a perspective view of a partially sectioned cartridge filter embodying the teachings of the present invention.

FIG. 1 illustrates the construction of the cartridge-type filter element 10 which includes a pair of end caps 12,14 formed at opposite ends of the cylindrical filter. A first filter element 16 is disposed within the cartridge in the manner of a right cylinder. Element 16 is advantageously extended, that is, folded or pleated so that its actual surface area far exceeds the surface area of a simple cylinder having the general dimensions of cartridge 10.

Disposed concentrically within first element 16 is a second filter element 18. The first and second filter elements are advantageously of substantially the same porosity and filtration characteristics, and in a preferred embodiment are formed of the same material.

In order to provide strength to the assembly, a foraminous core member 20 is disposed axially within the filter. Core member 20 may be constructed of any suitable material which is resistant to attack by the materials to be encountered during filtration, and provides the requisite degree of mechanical strength to the assembly. It has been found that a heavy mesh of a substantially inert plastic substance such as polypropylene performs admirably in the environments in which the subject filter is used. Further, it can be molded into a mesh-like structure which has a low degree of flow resistance.

Extending about the periphery of the first filter element 16 is a protective sheath 22 which may advantageously be constructed of the same material as core 20. In one successfully tested embodiment sheath 22 comprised a mesh having ½ inch square openings defined by filaments approximately 1/16 inch in diameter. In addition to lending additional strength to the cylindrical filter structure, the sheath serves to protect filter element 16 from injury and contain it within a desired cylindrical locus during reverse flow operation of the filter.

Finally, the annular void between the first and second filter elements may be filled with particulate activated charcoal as depicted at 24 of the Figures. As is familiar to those skilled in the art the activated charcoal provides both mechanical filtration, which is a function of the porosity of the mass of particulate charcoal, and further adsorbs contaminants from the filtered liquid flowing therethrough.

An important feature of the present invention is the material from which the filter elements are constructed. While a vast array of materials has been used for effecting filtration of liquids, the dual problems of effectiveness and cost continue to plague the filter manufacturing industry. The present inventor has found that an inexpensive, and yet highly effective, extended filter such as that shown at 16 of FIG. 1 may be formed of polypropylene paper. As used herein, the term "paper" will be used to designate a compacted layer of randomly-laid individual fibers, in contradistinction to a woven material formed of interlaced lengths of discrete strands in which the fibers are oriented in prescribed directions. It has been discovered that a polypropylene paper having a density of from approximately 100 to 200 grams per square meter provides admirable filtration qualities. For present purposes the permeability of the paper should be in the range of 2 to 60 microns. In addition to mechanically filtering matter from a flowing liquid, the polypropylene paper withstands attack by the corrosive materials commonly encountered. Still further, textured polypropylene paper has been found to be resistant to clogging, and is easily cleaned so as to renew its filtration qualities.

One important aspect of the use of a polypropylene paper filter element is the texture of the surface. It is preferred that the paper be provided with a matte finish which is neither glossy and slick nor bristly, i.e. not having a large number of fibrous ends protruding from the surface. An overly-smooth, slick surface does not provide good filtration for a given area of filter material, and is unduly difficult to clean by back flushing or otherwise. Although the reasons for this phenomenon are not known, it is believed that the relatively hard, non-resilient nature of the finish makes it difficult to loosen entrained particulate matter therefrom. Similarly an overly rough, bristly finish on the paper will entrap particles at the surface too readily, and has been found to be susceptible of clogging.

In a successfully tested embodiment a polypropylene filter element was provided with a stippled matte finish, the stippling comprised of small, discontinuous indentations approximately 1/16 inch long and repeating 12 times per inch. Such a pattern may be produced, for instance, by dewatering the newly-produced felted filter paper on a wire screen surface to obtain a texture similar to that of a household paper towel. As stated hereinabove not only does the texturing of the paper aid in preserving the filtration qualities of the material, but it also adds to its pliability, an important attribute when an extended-area filter element is to be formed.

By using the above-described polypropylene paper, it is possible to dispose finely divided activated charcoal between concentric filter elements without the charcoal fines migrating outwardly through the porous filter material. In this manner it is possible to construct filter cartridges of the type depicted without the need for a separate envelope for retaining the particulate charcoal.

In order to inexpensively form a unitary filter cartridge the axial ends of the filter members, including the charcoal, are terminated by encapsulating them in elastomeric end caps. A preferred material for forming the end caps is plastisol. Plastisol is relatively impervious to attack by the various liquids to be filtered and the contaminants found therein. Moreover, its elastomeric qualities allow it to resiliently deform against an abutting filter housing to provide a fluid-tight seal.

As is familiar to those skilled in the art, plastisol comprises a polyvinyl chloride dispersion in a plasticizer. In some cases, pigments are added to the plastisol to produce a desired color. In such cases an appropriate stabilizer may be added so that the pigment color does not change or fade. These variations are mere matters of design choice and are readily varied to meet the requirements of a given application. The amount of plasticizer which is used, however, is normally selected to meet certain criteria such as shelf life. When a high proportion of plasticizer is added, for instance as in the present case, the shelf life is severely attenuated and it is therefore necessary to mix batches as needed. In one successfully tested embodiment plastisol was obtained from Paisley Products of Edison, N.J. the proprietary designation used by Paisley Products to denominate plastisol being #6418-3. To this is added an appropriate plasticizer in the ratio of 15 parts of plasticizer to 100 parts of commercial plastisol. While the selection of an appropriate plasticizer is considered to be within the ability of those skilled in the art, in one instance SANTICIZER 160, manufactured by the Monsanto Chemical Corp., was found to be satisfactory plasticizer. With the proportions set forth above, the plastisol may be cured at a temperature below the melting point of the polypropylene filter material. Other plastisols currently available may not require the addition of plasticizer; however, the specific material selected for incorporation into the disclosed filter structure does not comprise part of the present invention. Regardless of the material selected, the plastisol is caused to encapsulate the ends of the filter elements and secure the filter members permanently together.

Figure 2:
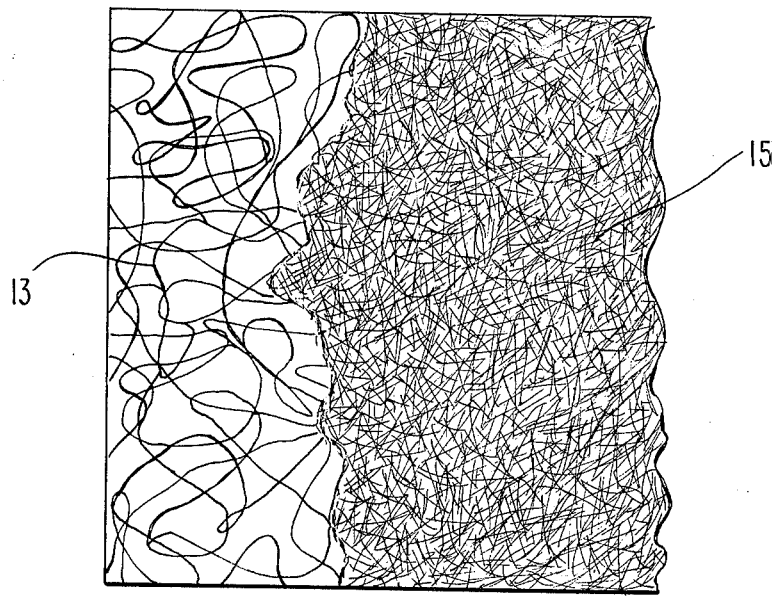
FIG. 2 illustrates the construction of an improved filter material.

FIG. 2 illustrates in somewhat idealized form an improved filter element which exhibits superior properties, particularly when pleated and thus used as an extended filter element. The structure of the filter material is such as to be less prone to breakage at folds therein, particularly in the presence of relatively high ambient heat, or due to an aging process. These factors have heretofore plagued filter material formed only of randomly-laid polypropylene fibers. The disclosed filter material is in fact a laminate, comprising an underlayer 13 of a relatively coarse and porous nature, that is, of a highly dispersed structure.

The underlayer 13 is formed of a continuous polypropylene fiber which is laid down in a random pattern, commonly upon leaving a spinnerette. The newly extruded fiber material adheres to itself, or may be subjected to sufficient heat to cause the fiber intersections to bond together. This technique is known in the art as "spin bonding" inasmuch as it is bonded to itself immediately after having been "spun" or discharged from the nozzle of an applicator.

One commercially-available material which has been used in a successfully-tested embodiment is a nonwoven sheet product marketed under the trademark "Typar" by the E. I. du Pont de Nemours Company of Wilmington, Delaware. The continuous polypropylene filament is randomly arranged, as illustrated in FIG. 2, and highly dispersed so as to offer little in the way of filtration. Such material is commonly used for upholstry support backing and the like, exhibiting substantial strength due at least in part to the multiplicity of bonding points which occur where the continuous fiber crosses upon itself.

The overlayer 15 of the depicted laminate comprises a filtering web of short polypropylene fibers which are deposited upon the supporting matrix formed by underlayer 13. By controlling the size and density of the fibers forming overlayer 15, the filtration characteristics of the resulting laminate can be controlled.

In order to form overlayer 15, short polypropylene fibers are blown onto underlayer 13 through the use of air pressure, and in a heated environment such that the polypropylene fibers are softened and adhere to both underlayer 13 and to one another. The fiber buildup technique is well known to those skilled in the art of paper manufacture and is termed "melt blowing", the material thus produced being designated a melt blown web. The process has been found highly appropriate inasmuch as it not only produces a blanket of relatively uniformly-dispersed polypropylene fibers which adhere to one another, but in addition allows the filtering overlayer to be permanently bonded to the coarse, supporting underlayer 13.

In a preferred embodiment the coarse underlayer 13 comprises an extended sheet of non-woven Taypar or the like and exhibits a gross density of approximately 2 ounces per square yard. Individual polypropylene fibers were then melt-blown onto the surface of the Typar to produce a laminate having a density of approximately 150 grams per square meter. By varying the thickness and density of the melt-blown polypropylene fibers a nominal filtration of from 2 to 60 microns has been obtained. More importantly, it has been found that the laminate thus formed is far more resistant to breakage when pleated or folded than are filter papers formed solely by melt-blown polypropylene fibers which approximate the overlayer 15 of the inventive laminate.

Thus, while the melt-blown short fibers by themselves have been found to break at folding points after being subjected to relatively high ambient temperatures, and after some aging period when laminated to an underlayer of a continuous, randomly-oriented polypropylene fiber, such breakage has been found to be avoided.

Figure 3:
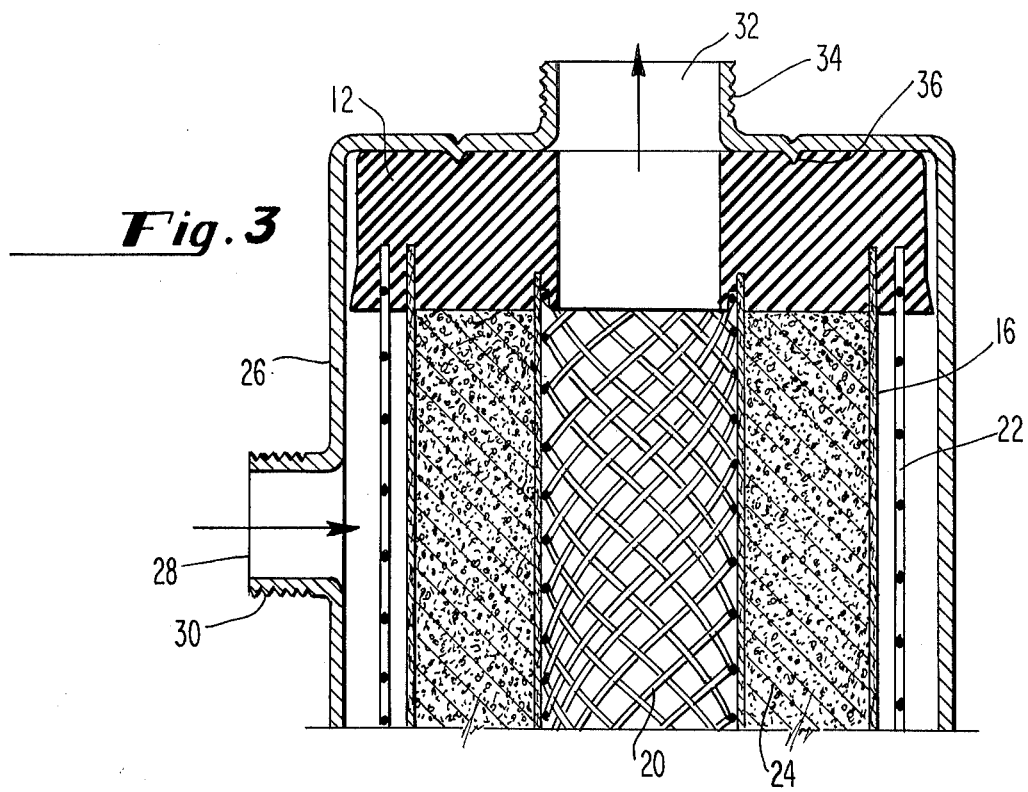
FIG. 3 is a sectioned elevational view of the filter of FIG. 1.

Turning now to FIG. 3, the construction of a cartridge-type filter, and its installation in a filter housing, is shown. Housing 26 advantageously takes the form of a hollow cylinder made of a corrosion-resistant material such as brass or stainless steel. An inlet 28 is provided in the lateral wall of the housing to receive a liquid to be filtered. Suitable threads 30 are formed upon the inlet to enable it to be coupled to an input conduit.

An outlet generally indicated at 32 is formed near the axial end of housing 26 to allow fluid to escape from within the filter cartridge. Threads 34 are formed upon the outlet neck to enable it to be coupled to an outlet conduit. Within the axial end of housing 26 is an annular ridge 36 which engages the surface of end cap 12 to provide a fluid-tight seal between the inlet and outlet portions of the filter.

The axial ends of filter elements 16 and 18, along with the corresponding ends of core 20 and sheath 22, extend well into end cap 12 and are surrounded thereby. The end cap is thus bonded to the ends of the various filter members to hold them in a predetermined position with respect to one another. The end cap also seals the particulate charcoal 24 in the annular space between the filter elements.

In use, a fluid to be filtered is introduced into housing 26 by way of inlet 28. The fluid impinges upon the outer surfaces of first filter element 16 due to the pressure supplied by an appropriate pump (not shown) disposed upstream in the fluid system. The fluid then passes through the pores in the first filter element, dispersing in and passing through the particulate activated charcoal 24. Impurities larger than the pore size of the filter element are thus prevented from being introduced into the charcoal-filter cavity. The charcoal acts to further filter out particulate matter, and also adsorbs impurities from the liquid. Finally, the liquid traverses the innermost filter element 18 and passes through openings in core 20 to be discharged through outlet 32.

It will be understood that in some applications it may be desirable to direct the fluid flow in a direction opposite to that just described. In either event, it will be seen that the unfiltered fluid must initially pass through a polypropylene filter paper before encountering the activated charcoal. This prevents particulate impurities from becoming embedded among the charcoal granules and impairing the efficiency of the charcoal filter. Similarly, it may be desired to temporarily reverse the direction of fluid flow so as to "back flush" the filter elements, causing the filtered particles lodged thereon to be dislodged and washed away and renewing the efficacy of the filtered cartridge. The qualities of the polypropylene filter material, including the matte finish provided thereto, allow the facile release of impurities entrained in the surface of the paper when the system flow is reversed, or when the filters are cleaned by other suitable means.

It will now be seen that there has been described an improved filter which is relatively simple and inexpensive to construct. Nonetheless, the device provides excellent filtration qualities, and is resistant to attack by most commonly-encountered materials. Therefore, as will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A filter comprising at least one folded pleat for removing contaminants from a fluid stream comprising:
    a laminated filter element including a single supporting underlayer formed of a highly dispersed continuous polypropylene filament oriented in a random pattern and repeatedly crossing itself, said filament being partially fused and thereby bonded to itself at substantially all of those points at which it crosses itself, and a filtering overlayer comprising a plurality of individual polypropylene fibers randomly arranged upon said supporting underlayer and bonded both to said underlayer and to one another, said folded pleat being substantially resistant to breakage at its fold.

2. A filter according to claim 1, wherein said filter element is disposed in the form of a cylinder.

3. A filter according to claim 2, further comprising resilient end caps disposed at either end of said cylinder and enveloping the ends thereof, said end caps being constituted of a thermosetting elastomeric mixture of plasticizers having a curing temperature which is no greater than the melting point of said filter element.

4. A filter according to claim 3, wherein said elastomeric mixture is a plastisol having sufficient plasticizer added thereto to lower the curing temperature of the resulting mixture to below the melting point of said filter element.

5. A filter of the cylindrical cartridge type, comprising:
   a pleated outer element having a plurality of folds;
   an unpleated inner element disposed concentrically within said outer element;
   a pair of elastomeric end caps enveloping the axial ends of said first and second element;
   said outer filament comprising a laminate including a first, supporting underlayer formed of a highly dispersed continuous polypropylene filament oriented in a random pattern, and a filtering overlayer comprising a plurality of individual polypropylene fibers randomly arranged upon said underlayer and being partially fused and thereby bonded to both said underlayer and to one another, said folds being substantially resistant to breakage.

6. A filter according to claim 5, further including a mass of particulate activated charcoal disposed between and in direct contact with said filter element.

7. A filter of the cylindrical cartridge type, comprising:
   a pleated outer filter element having a plurality of folds;
   a pair of elastomeric end caps disposed at either end of said filter element and enveloping the ends thereof;
   said filter element comprising:
      a supporting underlayer of a highly dispersed continuous polypropylene filament oriented in a random pattern, said continuous filament being partially fused and thereby bonded to itself at points of intersection; and
      a plurality of individual polypropylene fibers disposed upon said underlayer, said polypropylene fibers and filament material being at least partially heat-fused, whereby the polypropylene fibers are bonded to both said continuous filament and to one another, said folds being substantially resistant to breakage.

* * * * *

UNITED STATES PATENT AND TRADEMARK OFFICE
CERTIFICATE OF CORRECTION

PATENT NO. : 4,104,170
DATED : Aug. 1, 1978
INVENTOR(S) : Donald A. Nedza

It is certified that error appears in the above-identified patent and that said Letters Patent are hereby corrected as shown below:

Column 5, line 34, delete "Taypar" and substitute therefor --Typar--.

Signed and Sealed this

Sixth Day of March 1979

[SEAL]

Attest:

RUTH C. MASON
Attesting Officer

DONALD W. BANNER
Commissioner of Patents and Trademarks